Sept. 30, 1969  M. BOTTLING  3,469,668
RECEIPT PRINTER FOR VENDING MACHINES
Filed Dec. 20, 1967  2 Sheets-Sheet 1

INVENTOR
Manfred BOTTLING
By

Michael S Striker his ATTORNEY

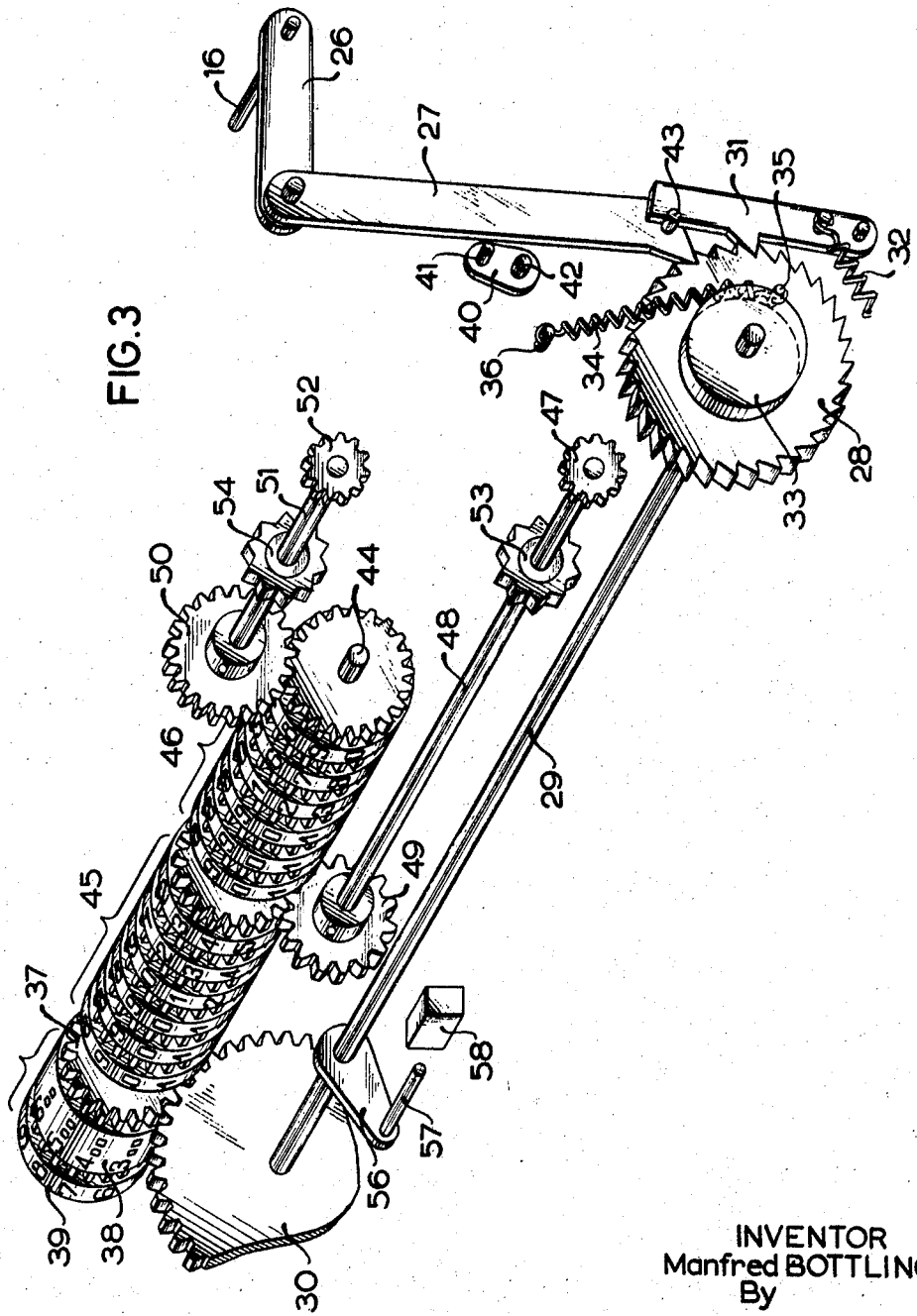

United States Patent Office 3,469,668
Patented Sept. 30, 1969

3,469,668
RECEIPT PRINTER FOR VENDING MACHINES
Manfred Bottling, Villingen, Germany, assignor to Kienzle
Apparate G.m.b.H., Villingen, Germany
Filed Dec. 20, 1967, Ser. No. 692,196
Claims priority, application Germany, Dec. 24, 1966,
K 61,028
Int. Cl. G07f *13/00, 15/00*
U.S. Cl. 194—3                                    10 Claims

ABSTRACT OF THE DISCLOSURE

The receipt printer of a coin operated liquid fuel vending machine has a first printing register for representing the price of the actually dispensed and sold fuel. Sensing means sense the monetary value of coins inserted into and retained by the vending machine, and control a second printing register to represent the monetary value of the retained coins. A receipt printed by the first and second printing registers, indicates an overpayment as the difference between the actually paid amount and the amount due for the actually dispensed amount of fuel.

BACKGROUNDS OF THE INVENTION

The present invention is concerned with an improvement of receipt printers for vending machines, particularly for printing receipts at an unmanned automatic gasoline vending station.

In accordance with the prior art, the value represented by volume and price indicating registers provided at the tank columns, are transferred to a printing register by which a receipt is printed showing the amount and price of the dispensed gasoline, or other fuel.

Fuel vending machines of this type are constructed for receiving only a limited number of coins, for example three coins respectively having the value of 1 DM, 2 DM and 5 DM (German marks). In the United States, the machine may be constructed to receive only dimes, quarters, and fifty cent pieces. It is necessary to insert the coins having the value of the intended purhase into the storage device of the vending machine so that an amount of fuel corresponding to the monetary value of the inserted coins can be continuously dispensed.

If the customer inserts into the vending machine, coins having such a value that the gas tank of the respective automobile is too small to receive the amount or volume of gasoline bought by the inserted coins, the dispensing operation automatically stops before the customer has received the amount of gasoline for which he has actually paid by coins which can no longer be returned.

In some cases, the overpayment can be substantial.

For example, if a customer inserts four 5 DM coins into the vending machine in order to buy a corresponding volume of gasoline, it may happen that the disensing operation must be stopped when only a volume of gasoline corresponding to the monetary value of DM 15.00 has flowed into the gas tank and completely filled the same. Since the customer has paid DM 20.00, and has received gasoline whose price is actually DM 15.50, the customer has overpaid an amount of DM 4.50 and has a corresponding loss if the respective gasoline station is fully automatic and unmanned.

If no claim can be immediately made, a later request for reimbursement for the overpayment cannot be supported by any evidence. If a receipt printer for printing a receipt for the value of the inserted and retained coins is provided, the receipt would not indicate the price of the actually received gasoline. If a second receipt is printed by a second receipt printer for indicating the dispensed amount of gasoline and its price, then it cannot be proven that the two receipts refer to the same transaction and dispensing operation.

SUMMARY OF THE INVENTION

It is one object to overcome the above-explained disadvantage of known receipt printers for automatic vending machines, and to furnish the customer a receipt clearly indicating an overpayment so that a proven claim for the return of the overpayment can be made on the basis of the receipt issued by the vending machine.

Another object of the invention is to provide a receipt printer for an automatic vending machine which prints on the same receipt sheet, the price of the actually dispensed fuel, and the monetary value of coins inserted into, and retained by the vending machine.

Another object of the invention is to provide a printer for printing a receipt indicating only the value of coins permanently retained by the vending machine, and not indicating the value of coins inserted into the vending machine, but returned by the same.

With these objects in view, the present invention provides a receipt printer with an additional printing register which is set to represent the total monetary value of coins inserted into, and retained by the vending machine, in addition to the price and volume of the actually dispensed gasoline which are printed on the same receipt.

It will be understood that the invention is not limited to printing receipts for fuel vending machines, but that a receipt printer of the invention can be used also with vending machines selling another commodity, such as a different liquid or fluid, or time which can be used for operating a machine or parking a car.

One embodiment of the invention is used with a coin operated vending machine having a cash receptacle for permanently retaining coins, and transporting means for depositing coins inserted into the vending machine into the cash receptacle.

In accordance with the invention, a first printing register is operated by the vending machine for representing the price of the commodity actually sold by the vending machine and sensing means for sensing the monetary value of coins transported by the transporting means to the cash receptacle and controlling a second printing register for representing the monetary value of coins permanently retained by the vending machine. A receipt sheet imprinted by the first and second printing registers, indicates an overpayment as the difference between the actually paid amount and the amount due for the actually sold amount of the commodity, both amounts appearing on the same receipt.

Preferably, another printing register prints on the same receipt the amount of the sold commodity, for example the volume of the fuel dispensed into the tank of the automobile of the customer. The sensing means of the vending machine turn a credit storage means in a storing direction, and the credit storage means is turned in the opposite direction by operating means during discharge of fuel until the value stored in the credit storage means by the sensing means is exhausted. It is advantageous to connect the turnable credit storage means with the second printing register by a transmission including a one-way coupling means, so that only additive values are introduced into the second printing register, while turning of the credit storage means in the opposite direction cannot subtract values from the values stored in the second printing register. The one-way coupling means preferably includes a ratchet wheel connected with the unit wheel of the second printing register, and a drive pawl reciprocated from the credit storage means when the same turns in storing direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a fragmentary perspective view illustrating a receipt printer in accordance with one embodiment of the invention, conventional parts being omitted for the sake of simplicity.

Figure 1:
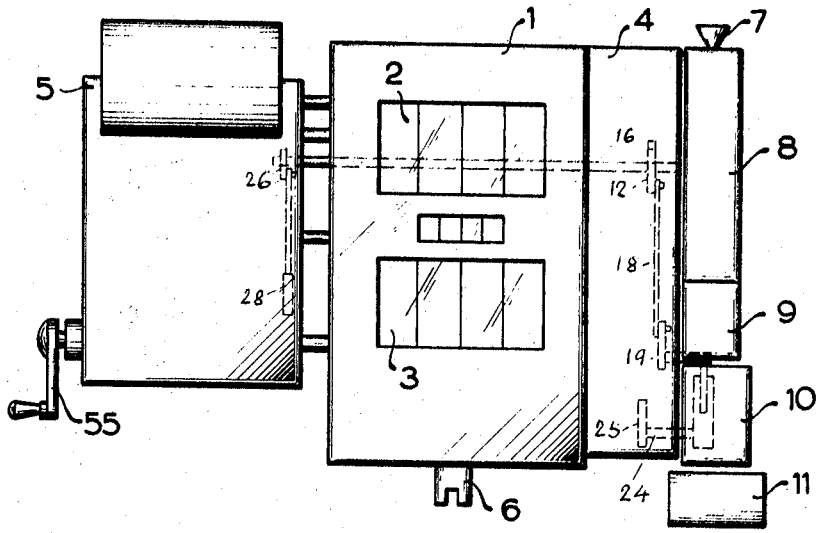
FIG. 1 is a fragmentary schematic front view illustrating a fuel vending machine with a receipt printer according to the invention.

Since receipt printers for printing the price and volume of an amount of fuel discharged by an automatic fuel vending machine are known, and, for example, disclosed in my U.S. patent application Ser. No. 677,524, conventional elements are omitted in the drawing, and the printing operations will not be described in detail. The construction and operation of a coin preselecting device forming part of the vending machine is also known and, for example, disclosed in the copending application Ser. No. 677,524, filed by Huester et al. and assigned to the same assignee as the present application.

DESCRIPTION OF A PREFERRED EMBODIMENT

Referring first to FIG. 1, the casing 1 of a tank column envelopes, in a conventional manner, a price register having four ordinal number wheels appearing behind windows 2, and a volume register having ordinal number wheels appearing behind windows 3 of the casing. The volume register is driven from a flow meter, not shown, responding to the amount of fuel dispensed from a dispensing nozzle, not shown, to drive the volume register and price register.

A receipt printer 5 is disposed on one side of casing 1, and a coin preselector 4 on the other side. Coin preselector 4 has a coin tester 8 which tests coins inserted into coin hopper 7, returns slugs, and arranges inserted different coins in accordance to size before they enter a coin storage 9. During the dispensing operation, the coins are successively transported from the coin storage 9 into a coin receptacle 11 by transporting means 21 located in a casing 10. While individual coins are transported from storage 9 into cash receptacle 11, the value of each coin is sensed, and the respective value entered into a credit storage device shown to be a ratchet sector 12 whose angular position represents the monetary value for which fuel is still to be dispensed.

A coin transporting means in the form of a sector-shaped member 21 having a slot 22 for receiving a coin 23 dropping out of storage 9, is fixed on a shaft 24 and operated by a lever arm 25 from the drive means of the vending machine to turn in clockwise direction for dropping a coin 23 out of slot 22 into the cash receptacle 11. A dimension of a coin 23, shown to be the diameter, is sensed by an angular sensing lever 19, one arm of which is in contact with the periphery of the coin 23, while the other arm is connected by a link 18 to an arm 17 of the credit storage member 12 which is biased by spring 15 to turn in clockwise direction and has teeth 13 defining five notches into which a pawl portion of an angular lever 14 projects under the action of a spring. Operating lever 14 is driven from the unit order wheel of the price calculator to periodically release credit storage member 12, and to permit turning movement of credit storage member 12 in clockwise direction under the action of spring 15 for an angular step corresponding to the distance between two notches, whenever an amount of fuel having the value of 1 DM has been dispensed, and the unit wheel of the price calculator has turned a corresponding angle.

Whenever lever 25 moves transporting member 21 to transport a coin into the cash receptacle 11, the sensing means 19 is operated, and turns credit storage member 12 in counterclockwise direction so that operating lever 14 engages the next following notch, or jumps two notches, or five notches, depending on whether a 1 DM coin, a 2 DM coin, or a 5 DM coin is sensed by sensing lever 19.

Figure 4:
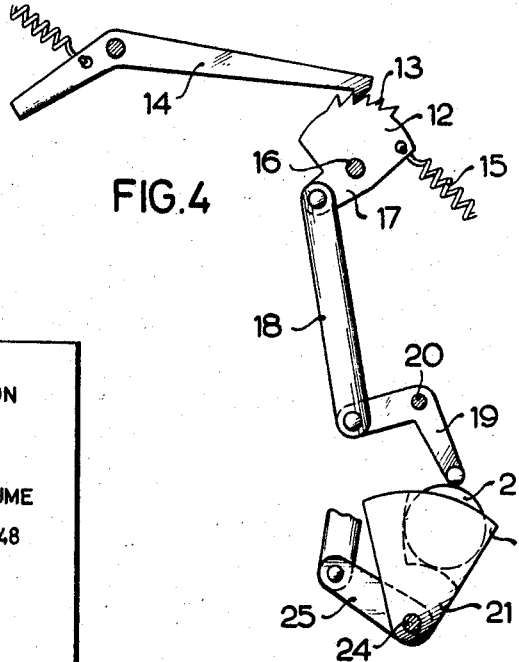
FIG. 4 is a fragmentary side view illustrating the credit storage means and coin sensing means of the vending machine.

FIG. 4 illustrates a 2 DM coin in the transporting member 21 which has caused turning of credit storage member 12 in counterclockwise direction to a position in which the tooth of lever 14 engages the second notch, permitting the discharge of fuel in the value of 2 DM.

The storing of the coin value in the credit storage means 12 takes place during the first half of the last revolution of the unit wheel of the price calculator, which deducts from the credit provided by the preceding coin while the same was transported by transporting member 21 into the cash receptacle 11, while being sensed by sensing means 19. The turning of credit storage member 12 for introducing credit corresponding to the newly sensed coin 23, is advanced so that the vending machine can automatically determine whether more fuel is to be dispensed in accordance with the value of further coins, or whether the dispensing operation has to be stopped when a part of the last DM coin, stored in the credit storage member 12, is used up. The next following coin in coin storage 9 is transported by transporting membre 10 into the cash receptacle 11 before the credit provided by the preceding coin by setting credit storage member 12 accordingly, has been used up.

It will be seen that credit storage member 12 turns counterclockwise in a credit storing direction, and clockwise when the stored credit is being used up during a dispensing operation. Credit storage member 12 is fixed to a shaft 16 which passes through the price calculator casing 1 into the casing of the receipt printer 5, as best seen in FIG. 1. As shown in FIG. 3, the end of shaft 16, which is located in the receipt printer 5, carries a fixed lever arm 26 to which a drive pawl 27 is articulated. Drive pawl 27 has an abutment pin against which a portion of a locking pawl 31 abuts under the action of a spring 32. The teeth of drive pawl 27 and of locking pawl 31 engage notches of a ratchet wheel 28 which has a hub portion 33 to which the end of a spring 34 is secured by means of a pin 35. The other end of spring 34 is attached to a stationary pin 36 so that the tensioned spring 34 urges ratchet wheel 28 to turn in counterclockwise direction as viewed in FIG. 3 but the steep flanks of the ratchet teeth abut the teeth of pawls 27 and 31, preventing turning of ratchet wheel 21 in counterclockwise direction.

Ratchet wheel 28 and hub 33 are fixed to a shaft 29 which carries a fixed gear 30 meshing with a gear 37 connected for rotation with a unit printing wheel 38 of a printing register which includes at least another printing wheel 39 associated with the next higher order. Since the coin storage 9 has a capacity for holding coins whose total value is not more than 40 DM, a printing register having only two orders with printing wheels 38 and 39 is sufficient. Since no coins associated with fractions of a DM are used, no fraction of a DM has to be represented by the printing register.

Printing wheels 38 and 39 are mounted for free turning movement on a shaft 44. An ordinal series of printing rollers is mounted on shaft 44 and forms a printing register 45 for representing the discharged volume of fuel. An ordinal series of printing rollers forming a printing register 46 is also mounted on shaft 44 for representing the price of the discharged fuel. A pinion 47 meshes with a gear, not shown, of the volume register behind window 3 in casing 1 and is connected by a shaft 48 to a gear 49 which meshes with the gear secured to the printing wheel of the lowest order of printing register 45. A pinion 52 meshes with the gear, not shown, of the price register behind windows 2 in casing 1 and drives through a shaft 51 a gear 50 meshing with a gear secured to the lowest order wheel of the price printing register 46. Shafts 48 and 51 have coupling star wheels 53 and 54 which form parts of couplings which are disengaged when clearing of volume printing register 45 and price printing register 46 is carried out.

A clearing lever 40 is carried by a shaft 42 which is angularly displaced during the clearing of the printing wheels in the receipt printer 5, and of the price register and volume register in casing 1. When clearing lever 40 is turned in clockwise direction, its projecting stud 41 turns drive pawl 27 to a position releasing ratchet wheel 28. Since locking pawl 31 abuts abutment pin 43 under the action of spring 32, it is also moved to a position releasing ratchet wheel 28, so that the one-way coupling means 27, 28, 31 is disengaged permitting clearing of the printing registers which would otherwise be prevented by pawls 27 and 31. When the clearing operation is finished, clearing lever 40 is turned in counterclockwise direction, and spring 32 moves pawls 31, and indirectly pawl 27 to positions in which the pawls engage notches of ratchet wheel 28, locking the same against turning movement in counterclockwise direction. When pawls 27 and 31 release the ratchet wheel 28, spring 34 turns the same in counterclockwise direction so that printing register 38, 39 is cleared, and when the same has been returned to its zero indicating position, a stop pin 57 on an arm 56 carried by shaft 29 engages an abutment stop 58 so that the clearing rotation of printing register 38, 39 is stopped. Thereupon, clearing lever 40 is operated to permit enggaement of pawls 27 and 31 with ratchet wheel 28.

Whenever a coin 23 is transported by transporting member 21 into the cash receptacle which permanently retains inserted coins, the sensing lever 19 is operated, and turns credit storing member 12 in counterclockwise direction an angular distance corresponding to the monetary value of the sensed coin, operating lever 14 locking credit storage member 12 in the angularly displaced position. Since shaft 16 turns with credit storage member 12, lever arm 26 is turned the same angle, and drive pawl 27 turns ratchet wheel 28 in clockwise direction, corresponding to the counterclockwise storing direction of credit storage member 12, so that the value of the sensed coin 23 is introduced into printing register 38, 39 by the transmission means 29, 30, 37. The number of teeth which ratchet wheel 28 is shifted, corresponds to the number of teeth which credit storage member 12 is shifted.

During the dispensing operation, locking lever 14 is operated to release credit storage member 12 to permit a step of the same under the action of spring 15 whenever fuel corresponding to the value of 1 DM has been dispensed so that credit storage member 12 returns to its initial position. During such turning movement of credit storage member 12 opposite to the storing direction, the turning movement of shaft 16 is not transmitted to printing register 38, 39, since the transmission means between shaft 16 and the printing register 38, 39 includes the one-way coupling 28, 27, 31 whose ratchet wheel 28 is locked by locking pawl 31 against turning movement in counterclockwise direction.

Figure 2:
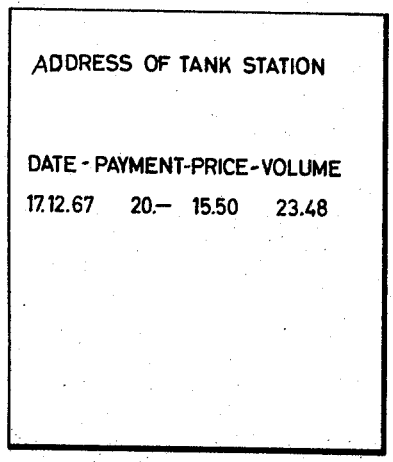
FIG. 2 is a view illustrating a receipt printed in accordance with the invention.

This operation is repeated when additional coins are transported by transporting member 21 into the cash receptacle 11. When the last coin in coin storage 9 has been transported into the cash receptacle 11, and sensed by sensing means 19, the value of all accepted coins is registered in printing register 38, 39, and during a following printing operation, the registered value of the sensed and permanently retained coins, which were transported to the cash receptacle 11, is printed in the second column of the receipt. FIG. 2 shows the monetary value of the retained coins to be DM 20, corresponding to four 5 DM coins. During the dispensing operation, the printing register 45 and the price register 46 were set to represent the volume and price of the amount of dispensed fuel, so that the price of the dispensed fuel is indicated in the third column of the receipt shown in FIG. 2 to be DM 15.50, and the dispensed volume to be DM 23.48.

The dispensing operation is continued until fuel having the same value as the sensed coins has been dispensed. In this event, the same monetary values appear in the second and third columns of the receipt shown in FIG. 2. However, if the dispensing operation had to be interrupted because the tank of the automobile was completely filled before the monetary value of the dispensed fuel reached the monetary value of the sensed coins, different amounts of DM appear in the second and third columns of the receipt, as shown in FIG. 2 whereby an overpayment of DM 4.50 is clearly indicated.

The receipt of FIG. 2 proves that fuel for the amount of DM 20 was paid for, while only an amount of 23.48 liters was actually received, whose price is only DM 15.50 since the price of 1 liter is assumed to be DM 0.66. The last 5 DM coin was already sensed and deposited in the cash receptacle 11 when the dispensing operation had to be stopped, and cannot be returned to the customer like coins in the coin storage 9 so that the same paid DM 4.50 too much, which is evident from the printed receipt shown in FIG. 2 automatically issued to the customer. Consequently, the customer can make a claim, supported by the printed receipt, for return of the overpayment of DM 4.50 which must be less than the value of the last sensed coin.

Before the following dispensing operation, printing registers 45 and 46 are cleared in the usual manner. The clearing of the printing register 38, which indicates the value of the sensed and retained coins, is effected by the force of spring 34 while pawls 27, 31 are disengaged from ratchet wheel 28 and permit free turning movement of the same in the clearing direction. When printing register 38, 39 is cleared, stop pin 57 abuts the damping stop 58. After the clearing of printing register 38, 39, clearing lever 40 is returned to its normal inoperative position shown in FIG. 3 so that the one-way coupling 28, 27, 31 is again engaged for transmitting the turning movement of credit storage member 12 under the control of the sensing means 19 to the printing register 38, 39.

During the clearing of printing register 38, 39, locking lever 14 is raised, and spring 15 returns credit storage member 12 to its initial position so that the same is cleared. If the full monetary value of the inserted coins accepted by coin tester 8 was used for buying fuel, the credit storage means is already in the initial position, and need not be cleared.

It will be understood that each of the elements described above, or two or more together, may also find a useful application in other types of automatic vending machines differing from the types described above.

While the invention has been illustrated and described as embodied in a receipt printer for printing the value of coins inserted into a fuel vending machine in addition to the price of the actually sold and dispensed fuel, it is not intended to be limited to the details shown, since various modifications and structural changes may be made without departing in any way from the spirit of the present invention.

What is claimed as new and desired to be protected by Letters Patent is set forth in the appended claims.

I claim:

1. A receipt printer for use with a coin operated vending machine comprising, in combination, a first printing register operated by the vending machine for representing the total price of a commodity actually dispensed and sold by the vending machine; a storage device for temporarily storing coins inserted into said vending machine; a cash receptacle for permanently retaining coins; transporting means for successively transporting coins from said storage device to said cash receptacle; sensing means for separately sensing the value of each coin transported by said transporting means; and a second printing register controlled by said sensing means for representing the monetary value of successively sensed coins permanently retained in said cash receptacle whereby upon interruption of the dispensing operation before all inserted coins have been transported and sensed, a receipt sheet imprinted by said first and second printing registers indicates an overpayment as the difference between the amount due for the actually dispensed and sold amount of the commodity and the amount retained in the form of sensed coins in said cash receptacle, while the value of returnable coins in said storage device is not registered or printed.

2. A receipt printer as claimed in claim 1 wherein said vending machine includes a credit storage means operated by said sensing means to store the value of each sensed coin; and operating means responsive to the actually dispensed amount of the commodity to reduce the value stored in said credit storage means while the same is being increased by said sensing means; and transmission means connecting said credit storage means with said second printing register for entering into the same the values sensed by said sensing means.

3. A receipt printer as claimed in claim 2 wherein said vending machine includes a credit storage means movable in opposite directions; wherein said sensing means moves said credit storage means in one direction a number of steps corresponding to the number of monetary units represented by each sensed coin; wherein said operating means are controlled from said first printing register to move said credit storage means in the opposite direction one step for each monetary unit added to said first printing register during the discharge of the commodity; and wherein said transmission means connect said credit storage means with said second printing register only for movement in said one direction.

4. A receipt printer for use with a coin operated vending machine having a cash receptacle for permanently retaining coins, and transporting means for transporting coins inserted into the vending machine to said cash receptacle, comprising, in combination, a first printing register operated by said vending machine for representing the price of a liquid actually sold by the vending machine; sensing means for sensing coins transported by said transporting means to said cast receptacle; a second printing register controlled by said sensing means for representing the monetary value of sensed coins permanently retained by said vending machine in said cash receptacle whereby a receipt sheet imprinted by said first and second registers indicate an overpayment as the difference between the actually paid amount and the amount due for the actually sold volume of the liquid; a credit storage means operated by said sensing means to store the value of the permanently retained coins; operating means for reducing the value stored in said credit storage means in accordance with the volume of the dispensed liquid, said credit storage means including a turnable storing member turned in a sorting direction by said sensing means, and in the opposite direction by said operating means; and a transmission connecting said turnable storing member with said second printing register and including a ratchet wheel connected with said second printing register and a drive pawl cooperating with said ratchet wheel and operated by said storage member to turn said ratchet wheel only in one direction so that a value is introduced into said second printing register only during turning movement of said storage member in said storing direction.

5. Receipt printer as claimed in claim 4 including first spring means biasing said ratchet wheel to turn with said second printing register in a clearing direction opposite to said one direction, a locking pawl blocking turning movement of said ratchet wheel in said clearing direction, second spring means for urging said drive pawl and said locking pawl into engagement with said rachet wheel, and clearing means for simultaneously moving said drive pawl and said locking pawl to a position releasing said ratchet wheel for turning movement by said first spring means for clearing said second printing register.

6. Receipt printer as claimed in claim 5 wherein said drive pawl has an abutment engaged by said locking pawl under the action of said second spring means so that said drive pawl and said locking pawl move together.

7. A receipt printer for use with a coin operated vending machine having a cash receptacle for permanently retaining coins, and transporting means for transporting coins inserted into the vending machine to said cash receptacle, comprising, in combination, a first printing register operated by said vending machine for representing the price of the commodity actually sold by the vending machine; sensing means for sensing coins transported by said transporting means to said cash receptacle; a second printing register controlled by said sensing means for representing the monetary value of sensed coins permanently retained by said vending machine in said cash receptacle whereby a receipt sheet imprinted by said first and second printing registers indicates an overpayment as the difference between the actually paid amount and the amount due for the actually sold amount of said commodity; transmission means connecting said sensing means with said second printing register, and including a turnable member, a ratchet wheel connected with said second printing register, and a pawl reciprocable by said turnable member to turn said ratchet wheel and thereby said second printing register in one direction to represent the monetary value sensed by said sensing means, and a locking pawl for blocking turning movement of said ratchet wheel in the opposite direction corresponding to subtraction of values in said second printing register.

8. A receipt printer for use with a coin operated vending machine having a cash receptacle for permanently retaining coins, and transporting means for transporting coins inserted into the vending machine to said cash receptacle, comprising, in combination, a first printing register operated by said vending machine for representing the price of a liquid actually sold by the vending machine; sensing means for sensing coins transported by said transporting means to said cash receptacle; a second printing register controlled by said sensing means for representing the monetary value of sensed coins permanently retained by said vending machine in said cash receptacle whereby a receipt sheet imprinted by said first and second printing registers indicates an overpayment as the difference between the actually paid amount and the amount due for the actually sold volume of said liquid; a credit storage means turned in a storing direction by said sensing means when the same sense a transported coin; operating means for turning said credit storage means in the opposite direction for reducing the value stored in said credit storage means in accordance with the volume of the dispensed liquid; and transmission means including one-way coupling means connecting said credit storage means with said second printing register only during turning movement in said storing direction so that the monetary value of the permanently retained coin is represented by said second printing register whereas turning movement of said credit storage means in said opposite direction does not cause a reduction of the value represented by said second printing register.

9. A receipt printer as claimed in claim 8 comprising clearing means for clearing said second printing register and operating said one-way coupling means to move to a disengaged position so that the clearing movement of said second printing register is not transmitted to said credit storage means.

10. A receipt printer as claimed in claim 8 wherein said credit storage means includes a ratchet sector having a plurality of teeth, each tooth corresponding to a monetary unit; wherein said operating means includes a transporting pawl cooperating with said teeth and being driven to turn said ratchet sector one step whenever an amount of fuel having the value of said monetary unit has been dispensed; and wherein said sensing means includes a linkage connected with said ratchet sector for turning the same an angle corresponding to the number of monetary units represented by the sensed coin, and a corresponding tooth of said ratchet sector is engaged by said pawl.

References Cited

UNITED STATES PATENTS

| | | | |
|---|---|---|---|
| 1,205,457 | 11/1916 | Kolar | 346—22 |
| 2,777,555 | 1/1957 | Banning | 194—13 |
| 3,152,754 | 10/1964 | Rapisarda et al. | 235—94 X |

JOSEPH W. HARTARY, Primary Examiner

U.S. Cl. X.R.

194—13; 222—30; 346—54, 43